Patented Apr. 6, 1948

2,439,222

UNITED STATES PATENT OFFICE 2,439,222

PIGMENT COMPOSITIONS

Mario Scalera and Robert E. Brouillard, Somerville, N. J., assignors to American Cyanamid Company, New York, N. Y., a corporation of Maine No Drawing. Application January 25, 1946, Serial No. 643,462

12 Claims. (Cl. 106—288)

This invention relates to reddish-blue to bluish-red compositions of matter. More specifically, it relates to reddish-blue to bluish-red pigments of outstanding permanence, brilliance, and color value.

The commercial value of pigments is determined by a variety of factors. One of the most important of these is the tinctorial strength, since it determines the final cost for obtaining any particular shade. Brilliance is also very important as it determines to a very large extent the desirability of a color. For most purposes, permanence, particularly to light, heat and atmospheric agents (such as acid or alkaline vapors) is essential. Also of importance, particularly for deep shades in enamels, lacquers, etc., are the masstone characteristics, since pigments with dark or jet masstones give desirable depth and fullness of shade not obtainable with pigments of light masstone. Softness of texture is in most instances a highly desirable feature of pigments, since it reduces the mechanical work necessary to develop maximum strength.

No pigment in the reddish-blue to bluish-red range meeting all of the above requirements, or even most of them, has been known to the trade. Hence in a palette of available pigments of high tinctorial strength, good brilliance, good permanence and satisfactory texture and masstone characteristics, there has been a conspicuous gap in the range between reddish-violet and blue.

A number of pigments are available which are of a reddish-blue to bluish-red shade. Typical examples are the Iron Blues (salts of iron cyanogen complex acids), Ultramarine, Alkali Blue, N-dihydro-1,2,1',2'-anthraquinone azine and 4,4'-dichloro-6,6'-dimethyl-2,2' - bis - thionaphthene indigo. All of these pigments have serious disadvantages which render them unsuitable for many purposes. Iron Blues and Ultramarine Blues have poor resistance to chemicals; for example, the Ultramarine is extremely sensitive to acid, Alkali Blue shows poor chemical stability and also low light fastness, and the latter two organic pigments are relatively dull and are high in cost.

According to the present invention a series of reddish-blue to bluish-red pigments of excellent tinctorial strength, masstone and fastness characteristics, and of outstanding color stability, are obtained by blending a blue pigment of the phthalocyanine class (tetrabenzotetrazaporphines) with a violet pigment of the halogenated isodibenzanthrone class.

Blending of various proportions of the blue and violet pigments permits obtaining shades throughout the desired range of reddish-blue to bluish-red. Ordinarily, when pigments are mixed, it is possible to calculate the color of the resulting blend. It is true this cannot be calculated by simple proportion because reflectance does not change linearly with concentration. However, there is an additive function for every color which can be plotted on a recording spectrophotometer of special type, such as that described in the Pineo Patent 2,218,357, as a curve, the shape of which is invariant with concentration. Over such curves the color theoretically resulting from the mixture of varying amounts of the two components can be calculated, the spectrophotometric curves permitting a simple and rapid graphical solution.

It is also possible by means of known instruments, such as for example, that described in the Hardy Patent 1,799,134, to calculate the integrated tristimulus values of any color, the tristimulus method being a standard method of evaluating color reflection since it was adopted by the International Commission on Illumination in 1931. The luminous reflectance may thus be expressed numerically in any units desired, and, of course the greater the reflectance the less the absorption by the color, and hence the lower the strength.

It has been found that mixtures of phthalocyanines and halogenated isodibenzanthrones according to the present invention do not follow the regular rules of pigment mixtures, and strengths are obtained which are greater than the sum of the strengths of the components as calculated.

The increased strength, which is greater than the sum of its constituent parts, will vary with the method used in blending, but in every case the blend gives a strength greater than that corresponding to its two components. A dry blend of the finely divided pigments gives the lowest increase in tinctorial strength. Wet blending gives a considerably greater increase and the maximum increase is obtained when the two pigments are co-precipitated from solution or partial solution in sulfuric acid by the acid pasting method, followed by drowning in water. The co-acid pasted pigments, particularly when the acid pasting and drowning is effected in the presence of an organic sulfonic acid such as xylene sulfonic acid, results in the maximum increase in strength.

It is not known why the mixture of the halogenated dibenzanthrones and phthalocyanines behave in this anomalous manner, and it is not desired to limit the present invention to any particular theory of action. It is difficult to conceive that the increase in strength can be a phenomenon of purely physical nature, but yet no chemical interaction has been detected and the present invention is not intended to be limited to a theoretical explanation involving chemical change. The unexpected results appear to be peculiar to blends of the phthalocyanines and halogenated isodibenzanthrones. Similar blends of copper phthalocyanine with dibenzanthrone or with unhalogenated isodibenzanthrones do not show the same improvement in pigment properties.

The phthalocyanine blues may be of various types. They are in general metal complexes of tetrabenzotetrazaporphine, which may or may not, under certain circumstances, contain nuclear halogen substitution. The most common pigments are the copper phthalocyanines, although nickel, cobalt, zinc and other metal phthalocyanines may be used, and even free phthalocyanines themselves. The halogenated isodibenzanthrones which are all violet pigments, may contain various amounts of halogen, the most important members of the class being the mono and polychloro and mono and polybromoisodibenzanthrones.

The relative proportions of the two pigments may vary widely, ranging from a little under 5 parts of the violet pigment and 95 parts of the phthalocyanine to mixtures containing 75 parts of the violet pigments and 25 parts of the phthalocyanine. The preferred desirable shades in general lie between 5% of the violet pigment and about 50%. The increase in tinctorial strength is observable throughout the whole range of pigment mixtures but it will vary somewhat, in general being rather greater nearer the middle of the range, as will be shown by the following tables for mixtures of 5% dichloroisodibenzanthrone and 95% copper phthalocyanine, and 25% of the dibenzanthrone with 75% copper phthalocyanine, respectively:

Strength (against copper phthalocyanine)

5% Dichloroisodibenzanthrone:
   Dry Blend_____ Approx. 125%
   Wet Blend_____ Approx. 135%
   Co-acid pasted blend_____ Approx. 145%
25% Dichloroisodibenzanthrone:
   Dry Blend_____ Approx. 130%
   Wet Blend_____ Approx. 155%
   Co-acid pasted blend_____ Approx. 220%

The very marked increase in tinctorial strength over that which a corresponding blend should give is not the only unexpected improvement of the present invention, although it is perhaps the one which goes most contrary to ordinary experience in color blending. The increased tinctorial strength is accompanied in every case not by any offsetting disadvantage in other properties, but by an increased jetness of masstone, softness of texture, and brightness of hue. The improvements of course will vary with different mixtures but are distinct and of practical value in every case. It is therefore an important advantage of the present invention that the astonishing increase in tinctorial strength is obtained without any compromise in desirable properties, but rather with an actual improvement in all the important properties.

The present invention permits obtaining an entire range of shades from reddish-violet to reddish-blue, with two classes of pigments which are moderate in cost and of desirable characteristics. The further advantage is obtained that all the different shades can be obtained by blending two pigments. It is therefore not necessary to produce a long line of different pigments in order to have available the range of shades desired.

The invention will be described in greater detail in conjunction with the following specific examples which illustrate typical blends. The parts are by weight.

EXAMPLE 1

9.5 parts of copper phthalocyanine and 0.5 part of dichloroiso-dibenzanthrone were dissolved in 140 parts of concentrated sulfuric acid at 50–55° C. When solution was complete, 20 parts of xylene were added and the mixture stirred until sulfonation of the xylene was complete. The solution was then drowned into a mixture of 400 parts of ice and 600 parts of water with vigorous stirring.

The precipitated pigment was isolated by filtration and washed successively with water until acid-free, with 500 parts of a 1% sodium carbonate solution and with water until alkali-free. The pigment was dried at 65–70° C.

The product is a blue powder which disperses readily into organic vehicles and is suitable for incorporation into printing ink, paints, enamels, lacquers and the like. It has excellent color stability.

EXAMPLE 2

Example 1 was duplicated using 9.0 parts of copper phthalocyanine and 1.0 parts of dichloro-iso-dibenzanthrone. The product was redder than that obtained in Example 1 but otherwise similar.

EXAMPLE 3

Example 1 was duplicated using 7.5 parts of copper phthalocyanine and 2.5 parts of dichloro-iso-dibenzanthrone. The product was much redder than that obtained in Example 1 but otherwise similar.

A comparison of the products obtained in Examples 1, 2, and 3, with the component pigments conditioned as in Example 1 gave the following results:

|  | Copper Phthalocyanine | Dichloroiso-dibenzanthrone | Product of— | | |
|---|---|---|---|---|---|
|  |  |  | Ex. 1 | Ex. 2 | Ex. 3 |
| Strength | 100% | Approx. 140% | Approx. 145% | Approx. 155% | Approx. 220%. |
| Masstone | Type | Much darker and redder | Darker | Darker | Darker. |
| Undertone | do | Very much redder | Redder | Redder | Much redder. |
| Overtone | do | Much more | Much more | Much more | Much more. |
| Shade | do | Very much redder | Redder and duller | Redder and duller | Much redder. |

It should be noted that if there was no combined action of the two pigments one on the other, a simple calculation would show that the pigment of Example 1 would be expected to have 102% the strength of copper phthalocyanine, that of Example 2, 104%, and that of Example 3, 110%.

Actually the co-acid pasted pigments of Examples 2, 3 and 4 showed strengths which were respectively 43%, 51% and double that which would be expected if the strengths of the two components were simply added. The co-acid pasted products, therefore, even in the extreme case of Example 1 where only 5% of isodibenzanthrone is present, show an increase in strength of more than 40%.

A similar comparison with N-dihydro-1,2,1',2' anthraquinone azine:

|  | N-dihydro-1, 2, 1' 2' anthraquinone-azine | Dichloroisodibenzan-throne | Product of— | | |
|---|---|---|---|---|---|
|  |  |  | Ex. 1 | Ex. 2 | Ex. 3 |
| Strength | 100% | Approx. 140% | Approx. 145% | Approx. 155% | Approx. 225%. |
| Masstone | Type | Much darker and redder | Much darker | Much darker | Much darker. |
| Undertone | do | Very much redder | Much greener and much brighter. | Much greener and much brighter. | Redder. |
| Overtone | do | Much more | Much more | Much more | Much more. |
| Shade | do | Very much redder | Much greener and brighter. | Much greener and much brighter. | Redder. |

EXAMPLE 4

Example 1 was duplicated using 5 parts of copper phthalocyanine and 5 parts of dichloro-iso-dibenzanthrone. The product was much redder and stronger than that obtained in Example 3 but otherwise similar.

EXAMPLE 5

Part A 100 parts of copper phthalocyanine was acid-pasted according to Ex. 1.

One-half of the product was dried at 65–70° C. and the other half was saved as a wet pulp.

Part B 20 parts of dichloro-iso-dibenzanthrone was acid-pasted according to Example 1.

One-half of the product was dried at 65–70° C. and the other half was saved as a wet pulp.

Part C 1. 9.5 parts of the dry copper phthalocyanine of Part A and 0.5 parts of the dry dichloro-iso-dibenzanthrone of Part B were thoroughly blended.

2. 9.0 parts of dry copper phthalocyanine of Part A and 1.0 part of the dry dichloro-iso-dibenzanthrone of Part B were thoroughly blended.

3. 7.5 parts of the dry copper phthalocyanine of Part A and 2.5 parts of the dry dichloro-iso-dibenzanthrone of Part B were thoroughly blended.

4. 9.5 parts of real copper phthalocyanine as the wet pulp of Part A and 0.5 parts of real dichloro-iso-dibenzanthrone as the wet pulp of Part B were thoroughly blended and dried at 65–70° C.

5. This experiment was carried out as Example 5C4 but using 9 parts of real copper phthalocyanine and 1.0 parts of real dichloro-iso-dibenzanthrone.

6. This experiment was carried out as Example 5C4 but using 7.5 parts of real copper phthalocyanine and 2.5 parts of real dichloro-iso-dibenzanthrone.

Given below is a comparison of the strengths of the above example, using copper phthalocyanine as the standard.

| Dichloro-iso-dibenzanthrone content | Co-acid pasted | Dry-blended | Wet blended |
|---|---|---|---|
| 5% | Example 1, 143% | Example 5C1, approx. 125% | Example 5C4, approx. 135%. |
| 10% | Example 2, 154% | Example 5C2, approx. 115% | Example 5C5, approx. 130%. |
| 25% | Example 3, 222% | Example 5C3, approx. 130% | Example 5C6, approx. 155%. |

EXAMPLE 6

9.0 parts of copper phthalocyanine and 1.0 parts of mono-bromo-iso-dibenzanthrone were co-acid pasted as described in Example 1. The product was similar to that obtained in Example 2.

EXAMPLE 7

8.0 parts of copper phthalocyanine and 2.0 parts of mono-bromo-iso-dibenzanthrone were co-acid-pasted as described in Example 1. The product was redder than that obtained in Example 6 but otherwise similar.

EXAMPLE 8

6.0 parts of copper phthalocyanine and 4.0 parts of monobromo-iso-dibenzanthrone were co-acid-pasted as described in Example 1. The product was redder than that obtained in Example 7 but otherwise similar. A comparison of the products of Examples 6, 7, and 8, with the component pigments, conditioned as in Example 1, gave the following results:

|  | Copper Phthalocyanine | Monobromo-isodibenzanthrone | Product of— | | |
|---|---|---|---|---|---|
|  |  |  | Ex. 6 | Ex. 7 | Ex. 8 |
| Strength | 100% | Approx. 40% | Approx. 120% | Approx. 125% | Approx. 145%. |
| Masstone | Type | Much duller | Much darker | Much darker | Much darker. |
| Undertone | do | Very much redder | Much redder | Much redder | Very much redder. |
| Overtone | do | Less | More | More | Slightly more. |
| Shade | do | Very much redder | Much redder | Much redder | Much redder. |

A simple calculation of the strengths of the components of Examples 6, 7 and 8 would give 94%, 88% and 76% the strength of copper phthalocyanine respectively. The actual strength of the co-acid pasted blends are therefore 24%, 37% and 69% greater than that obtained by a simple calculation of the strengths of the components.

Example 9

Example 1 was duplicated, using 9.0 parts of nickel phthalocyanine and 1.0 parts of dichloro-iso-dibenzanthrone. The pigment obtained was similar to that of Example 2.

Example 10

Example 1 was duplicated using 9.0 parts of zinc phthalocyanine and 1.0 parts of dichloro-iso-dibenzanthrone. The pigment obtained was similar to that obtained in Example 2.

Example 11

Example 1 was duplicated using 9.0 parts of metal-free phthalocyanine and 1.0 parts of dichloro-iso-dibenzanthrone and keeping the temperature below 5° C. during the acid-pasting. The pigment obtained was similar to that obtained in Example 2.

Example 12

Example 1 was duplicated using 9.0 parts of monochloro-copper phthalocyanine and 1.0 parts of dichloro-iso-dibenzanthrone. The pigment obtained was similar to that obtained in Example 2.

We claim:

1. Composite pigments comprising from about 5% to 75% of pigments of the halogenated isodibenzanthrone class with about 95% to 25% of blue tetrabenzotetrazaporphine pigments.

2. Composite pigments comprising from about 5% to 75% of pigments of the halogenated isodibenzanthrone class with about 95% to 25% of copper phthalocyanine.

3. Composite pigments comprising from about 5% to 75% of dichloro-isobenzanthrone with about 95% to 25% of blue tetrabenzotetrazaporphine pigments.

4. Composite pigments comprising from about 5% to 75% of monobromoisodibenzanthrone with about 95% to 25% of blue tetrabenzotetrazaporphine pigments.

5. Composite pigments comprising from about 5% to 75% of dichloroisodibenzanthrone with about 95% to 25% of copper phthalocyanine.

6. Composite pigments comprising from about 5% to 75% of monobromoisodibenzanthrone with about 95% to 25% of copper phthalocyanine.

7. A process of preparing a composite pigment which comprises dissolving from 5 to 75% of pigments of the halogenated isodibenzanthrone class and 95 to 25% of blue tetrabenzotetrazaporphine pigments in concentrated sulfuric acid and coprecipitating a composite pigment by diluting the mixture with water.

8. A process of preparing a composite pigment which comprises dissolving from 5 to 75% of pigments of the halogenated isodibenzanthrone class and 95 to 25% of copper phthalocyanine pigments in concentrated sulfuric acid and coprecipitating a composite pigment by diluting the mixture with water.

9. A process of preparing a composite pigment which comprises dissolving from 5 to 75% of pigments of the dichloroisodibenzanthrone class and 95 to 25% of copper phthalocyanine pigments in concentrated sulfuric acid and coprecipitating a composite pigment by diluting the mixture with water.

10. A process of preparing a composite pigment which comprises dissolving from 5 to 75% of pigments of the monobromoisodibenzanthrone class and 95 to 25% of copper phthalocyanine pigments in concentrated sulfuric acid and coprecipitating a composite pigment by diluting the mixture with water.

11. A process according to claim 7 in which the solution in sulfuric acid is effected in the presence of substantial quantities of xylene sulfonic acid.

12. A process according to claim 8 in which the solution in sulfuric acid is effected in the presence of substantial quantities of xylene sulfonic acid.

MARIO SCALERA.
ROBERT E. BROUILLARD.